United States Patent [19]

Andersson

[11] Patent Number: 5,454,398
[45] Date of Patent: Oct. 3, 1995

[54] THROUGHFLOW VALVE AND A METAL MOULD TOOL FOR MANUFACTURING A VALVE SEAT OR A VALVE BODY

[75] Inventor: Sven Andersson, Mora, Sweden

[73] Assignee: FM Mattsson AB, Mora, Sweden

[21] Appl. No.: 190,179

[22] PCT Filed: Aug. 20, 1992

[86] PCT No.: PCT/SE92/00565

§ 371 Date: Feb. 3, 1994

§ 102(e) Date: Feb. 3, 1994

[87] PCT Pub. No.: WO93/04308

PCT Pub. Date: Mar. 4, 1993

[30] Foreign Application Priority Data

Aug. 21, 1991 [SE] Sweden .................... 9102413

[51] Int. Cl.[6] .................................................. F16K 15/02
[52] U.S. Cl. ............................................................. 137/513.5
[58] Field of Search ............................................. 137/513.5

[56] References Cited

U.S. PATENT DOCUMENTS

| | | | |
|---|---|---|---|
| 1,151,329 | 8/1915 | Audett | 137/513.5 |
| 2,672,888 | 3/1954 | Shields | 137/513.5 |
| 4,030,520 | 6/1977 | Sands | 137/513.5 |
| 4,431,019 | 2/1984 | Kopp | 137/513.5 |

FOREIGN PATENT DOCUMENTS

| | | |
|---|---|---|
| 381925 | 1/1990 | European Pat. Off. . |
| 401607 | 5/1990 | European Pat. Off. . |
| 3140438 | 4/1983 | Germany . |
| 96274 | 5/1986 | Japan . |
| 455124 | 6/1988 | Sweden . |

*Primary Examiner*—Robert G. Nilson
*Attorney, Agent, or Firm*—Sughrue, Mion, Zinn, Macpeak and Seas

[57] ABSTRACT

A throughflow valve (1) comprising a valve seat (2) and a valve body (3) is intended to permit a given flow of fluid to pass therethrough when the valve is closed. To this end, the mutually abutting surfaces (2a; 3a) of the valve seat and/or the valve body are irregular or roughened, these irregularities having a size of 20–100 μm. The invention also relates to a mould tool provided with corresponding irregular or roughened surface created by a so-called sparking operation.

1 Claim, 1 Drawing Sheet

THROUGHFLOW VALVE AND A METAL MOULD TOOL FOR MANUFACTURING A VALVE SEAT OR A VALVE BODY

FIELD OF THE INVENTION

The present invention relates to a throughflow valve having a valve seat and valve body, particularly a check valve or safety valve for mixer valve damping means, in which a limited flow of fluid through the valve is permitted even when the valve body lies against the valve seat.

According to another aspect, the invention also relates to a metal mould tool for manufacturing the valve seat or valve body of such a throughflow valve.

STATE OF THE ART

Throughflow valves, such as check valves, in which a desired, restricted flow of fluid is permitted through the valve with the aid of a V-shaped recess in the surface of the seat when the valve is closed are known to the art. One serious drawback with valve seats of this kind, however, is that contaminants or foreign bodies present in the fluid that passes through the valve are easily caught in the V-shaped recess, thereby preventing the desired minimum flow of fluid or "leakage" through the valve when the valve is closed. The contaminants become wedged in the recess and are liable to jeopardize effective long-term functioning of the valve.

Also known to the art are different types of valves having sintered or porous valve bodies or barrier elements, which permit a given flow of fluid through the valve when the valve is closed. Examples of such valves are found described in DE,A1,3.140,438 (Wittenstein) and JP,A,61-96274 (Sumitomo Electric). These valves, however, are expensive to manufacture and problems are encountered in accurately determining the minimum amount of fluid that shall flow through the valve, particularly since there is a risk that contaminants carried by the fluid will collect in the porous or elastic valve material when the valve has been in use for some time.

Other, related valves used for different purposes than the aforesaid valves are described, for instance, in U.S. Pat. No. 3,185,438 (Smirra), EP,A1, 0 401 607 (Bürkert) and EP,A2,0 381 925 (Cummins Engine Company).

SE,B,8604612-5 (publication No. 455,124) (FM Mattsson) describes a single-lever type mixer valve provided with a damping arrangement which incorporates a throttle plate functioning as a throughpass valve of the kind intended here.

OBJECT OF THE INVENTION

The object of the present invention is to provide at low cost an improved throughflow valve which will avoid the drawbacks of the earlier known, similar valves and which can be used in different contexts.

SUMMARY OF THE INVENTION

These and other objects are fulfilled by an inventive throughflow valve of the aforedescribed kind and generally characterized in that the surface of the valve seat and/or the valve body is irregular or roughened so as to permit a limited flow of fluid to pass between the irregularities in the valve-seat surface and/or the valve body surface.

This valve feature enables a minimum flow of fluid through the valve to be ensured without blockaging of the valve, in distinction to the earlier known valves.

Although fluid-carried contaminants may fasten in the roughened or irregular surface, it has been found in practice that these contaminants will be dislodged and removed within a short period of time, the effect produced by contact of the valve body with the valve seat also contributing in this respect.

The contaminants thus have no tendency to become firmly wedged, as in the case of valve seats provided with V-shaped grooves.

In practice, at least the major part of the irregularities should have a size in the order of 20–100 µm (microns).

The irregular or roughened surface can be produced in practice by subjecting the metal mould tool used to manufacture the valve seat and/or the valve body to a "sparking operation", wherein when manufacturing the mould tool a voltage is applied between the tool and an electrode, thereby generating an electric arc which "pits" the material. The parameters applied during the sparking operation are selected so that the tool surface will be pitted with irregularities of a given desired size, which in the subsequent injection moulding process used to manufacture the valve seat or valve body will result in a corresponding roughened or "pitted" surface of the injection moulded seat.

Accordingly, another aspect of the invention relates to a metal mould tool for the manufacture of a valve seat or valve body of a throughflow valve of the kind concerned here.

BRIEF DESCRIPTION OF THE DRAWINGS

The invention will now be described in more detail with reference to an exemplifying embodiment thereof and also with reference to the accompanying drawings, in which.

BEST MODE OF CARRYING OUT THE INVENTION

Figure 1:
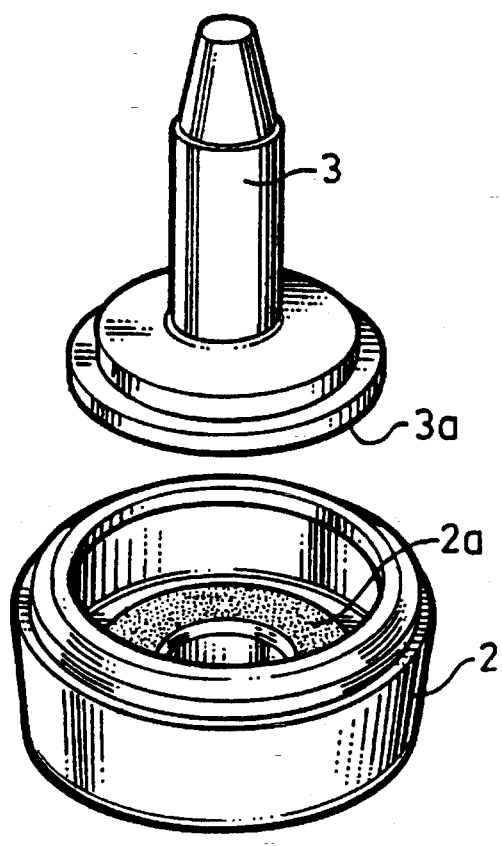
FIG. 1 is a perspective view of the two valve parts, namely the valve seat and the valve body of an inventive throughflow valve.
Figure 2:
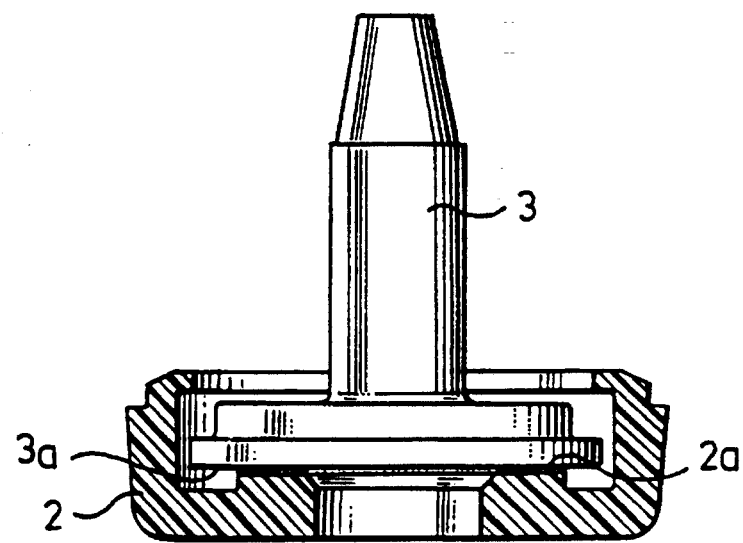
FIG. 2 is a cross-sectional view of a closed throughflow valve which permits a limited minimum flow of fluid therethrough.

The throughflow valve 1 illustrated in the drawing comprises a valve seat 2 and a valve body 3. The valve seat 2 has a seat surface 2a which abuts a corresponding surface 3a on the valve body 3 when the valve is closed, as shown in FIG. 2.

In order to permit a given minimum flow of fluid to pass through the valve when the valve is closed, the seat surface 2a is "pitted", i.e. roughened with a large number of irregularities having a size which may lie in the range of 20–100 µm and which in the case of an embodiment applied in practice has a size of 40–60 µm.

The roughened or pitted surface is produced when manufacturing the valve seat by virtue of the fact that the surface of a mould tool used to manufacture the seat surface is subjected to a so-called sparking operation so as to form a roughened or irregular surface corresponding to the surface of the valve seat. In this regard, an electric voltage is applied between the surface of the mould tool and an electrode, so as to generate an electric arc and therewith pit the tool material so as to form an irregular or pitted surface thereon.

Alternatively, or additionally, the seat abutment surface 3a of the valve body 3 may be provided with a corresponding roughening or irregularities. Normally, however, it is sufficient for only one of the surfaces to be roughened, the valve seat part being chosen for this purpose in the majority of cases.

The seat part and the valve body respectively may be made of any desired material, such as a plastic material or metal. The roughened surface can be produced in many ways other than the preferred method described above. For example, a computer controlled copy milling machine can be used for the aforesaid purpose instead of the sparking operation.

The size of the irregularities may vary in accordance with the use for which the throughflow valve is intended.

I claim:

1. A throughflow valve, particularly a check valve or a safety valve for a damper means of a mixer valve, comprising:

a) a rigid valve seat (2), b) a rigid valve body (3) cooperable with the valve seat, and c) means for enabling a limited flow of fluid to pass through the valve when the valve is fully closed with the valve body in engagement with the valve seat, said enabling means comprising both an engagement surface (2a) of the valve seat and a corresponding engagement surface (3a) of the valve body being planar, and at least one of the engagement surface of the valve seat and the engagement surface of the valve body being irregularly roughened continuously over an entire engagement area between the valve seat and the valve body, d) wherein at least a major portion of the irregularities have a size lying in the range of 20–100 µm.

* * * * *